United States Patent [19]

Krisbergh et al.

[11] Patent Number: 5,138,649
[45] Date of Patent: Aug. 11, 1992

[54] PORTABLE TELEPHONE HANDSET WITH REMOTE CONTROL

[75] Inventors: Harold M. Krisbergh, Rydal; David E. Wachob, Elkins Park, both of Pa.

[73] Assignee: General Instrument Corporation, Hatboro, Pa.

[21] Appl. No.: 614,621

[22] Filed: Nov. 16, 1990

[51] Int. Cl.$^5$ ............................................. H04M 11/00
[52] U.S. Cl. ........................................ 379/56; 379/58; 359/146; 358/85; 358/194.1; 455/344
[58] Field of Search ................... 379/56, 58, 61, 62, 379/102, 110; 455/151, 344, 346, 352; 358/85, 194.1; 359/142, 145-148, 144

[56] References Cited

U.S. PATENT DOCUMENTS

| | | |
|---|---|---|
| 4,338,492 | 7/1982 | Snopko . |
| 4,349,701 | 9/1982 | Snopko . |
| 4,356,509 | 10/1982 | Skerlos et al. . |
| 4,377,729 | 3/1983 | Stacy . |
| 4,392,022 | 7/1983 | Carlson . |
| 4,414,432 | 11/1983 | Skerlos et al. . |
| 4,427,847 | 1/1984 | Hofmann et al. . |
| 4,456,925 | 6/1984 | Skerlos et al. . |
| 4,465,902 | 8/1984 | Zato . |
| 4,482,947 | 11/1984 | Zato et al. . |
| 4,508,935 | 4/1985 | Mastromoro ................ 379/62 |
| 4,626,847 | 12/1986 | Zato . |
| 4,775,996 | 10/1988 | Emerson et al. ............ 379/61 |
| 4,855,746 | 8/1989 | Stacy . |

FOREIGN PATENT DOCUMENTS 0133798 6/1988 Japan ........................ 379/56

OTHER PUBLICATIONS

Installation Manual, "Jerrold Starfone Two-Way Converters-Impulse 7000 Series", General Instrument Corporation, Jun. 1988.

Primary Examiner—James L. Dwyer
Assistant Examiner—Dwayne D. Bost
Attorney, Agent, or Firm—Barry R. Lipsitz

[57] ABSTRACT

A remote control for one or more appliances and a telephone handset are combined into a single unit. A common keypad is used for both remote control and telephone functions. An appliance control signal is generated in response to the actuation of at least one of the keypad keys. The appliance control signal is transmitted via an infrared communication link. A telephone control signal is generated in response to the actuation of at least one of the keypad keys, and transmitted via an infrared or radio frequency communication link. Telephone audio signals from a microphone and to an earphone are communicated via a radio frequency communication link. The remote control/telephone handset is particularly advantageous for use in combination with a cable television converter/descrambler or satellite television receiver.

31 Claims, 4 Drawing Sheets

PORTABLE TELEPHONE HANDSET WITH REMOTE CONTROL

BACKGROUND OF THE INVENTION

The present invention relates to portable telephone apparatus, and more particularly to a portable telephone handset in combination with a remote control for a cable television converter, satellite television receiver, or the like.

Various prior art references disclose the combination of a television remote control and a telephone. U.S. Pat. No. 4,392,022 discloses apparatus for controlling a telephone through a television remote control. All signals between the remote control and television/telephone are transmitted via an infrared ("IR") transmission link. This requires that the remote control be properly oriented with respect to an IR receiver mounted in the television at all times during operation of the remote control and/or telephone. This requirement is a disadvantage, particularly for telephone use. Unlike the operation of a television remote control, which only requires a momentary actuation of the remote control while pointed at the television, a telephone conversation can extend over a long duration. Requiring the user to keep the remote control properly oriented for operation of the IR transmission link for an extended time period is inconvenient and can cause fatigue.

U.S. Pat. Nos. 4,338,492; 4,349,701; 4,356,509; 4,377,729; 4,414,432; 4,427,847; 4,456,925; and 4,465,902 illustrate various television/telephone systems that suffer other disadvantages, such as a television mounted speaker phone that does not allow a private conversation.

U.S. Pat. Nos., 4,482,947; 4,626,847; and 4,855,746 disclose universal remote control transmitters that may be used to control a plurality of functions in a number of different devices. Each of the remote controls disclosed comprises a single infrared transmitter for effecting all remote control operations.

It would be advantageous to provide a remote control combined with a telephone handset that includes a separate transceiver, such as a radio frequency ("RF") transceiver, for use in carrying telephone audio signals while maintaining a conventional infrared link for communicating control signals to a television signal converter, telephone, or other appliance. By providing a separate link for telephone audio communications, the known advantages of infrared data links can be maintained while overcoming the disadvantages of such links for telephone audio communications. It would also be advantageous to provide an alternate system that carries all telephone signals (audio and control) on an RF link and all television control signals on an infrared link. It would be further advantageous to reduce the cost of a combined remote control and portable telephone handset by sharing, to the extent possible, components necessary for generating and transmitting control signals to implement both telephone and remote control features.

It would be further advantageous to provide a remote control and telephone handset in combination with a television signal converter, such as a cable television converter. Such a combined system could utilize the cable television network to communicate telephone signals to a central office. Such a system could also facilitate the implementation of pay-per-view cable television services wherein program ordering data is forwarded to the cable headend via a telephone return path.

The present invention provides apparatus having the aforementioned advantages.

SUMMARY OF THE INVENTION

In accordance with the present invention, a television remote control and telephone handset apparatus is provided. A housing contains a plurality of keys, and means responsive to the actuation of at least one of said keys generates a television control signal. Means are provided for transmitting the television control signal via an infrared communication link. Means are also provided for generating a telephone control signal in response to the actuation of at least one of said keys. The telephone control signal is transmitted via the infrared or a separate radio frequency communication link. A microphone is provided for generating telephone audio signals, that are transmitted via a radio frequency communication link. Similarly, an earphone for reproducing telephone audio is provided. The earphone receives telephone audio signals via said radio frequency communication link.

In an illustrated embodiment, the television control signal comprises data for operating a cable television converter. The television and telephone control signal generating means share a microprocessor coupled to receive actuation signals from the keys. The microprocessor also outputs the control signals to the infrared communication link.

A television signal converter, such as a cable television converter, is provided for communicating with a remote control and telephone handset. An infrared data signal receiver is coupled to a processor that processes received converter control signals. Means operatively associated with the processor are provided to control a converter function in response to a received converter control signal. A telephone function is controlled in response to a telephone control signal received on either the infrared link or a separate RF link. Telephone base station means are coupled to the processor for communication of telephone audio signals to and from the telephone handset via an RF communication link.

A unitary television remote control and telephone handset is provided for use in combination with the television signal converter. The remote control generates a converter control signal in response to a user input. The telephone handset generates a telephone control signal in response to a user input. Infrared transmitter means transmit the converter control signal to the infrared data signal receiver in the converter. The telephone control signal can also be transmitted by the infrared transmitter, or by a separate RF transmitter that is also used to transmit telephone audio from a microphone to the converter telephone base station. RF receiver means receive telephone audio from the converter telephone base station for reproduction by an earphone.

The television signal converter can further comprise interface means coupled to the telephone base station for communicating telephone signals to a central office via a television signal communication path. In an illustrated embodiment, the television signal communication path is a cable television network.

The television signal converter can also include means operatively associated with the processor for generating an on-screen display of a telephone number identified by the telephone control signals. The on-screen display provides an indicia of a dialed telephone number on a user's television screen. The converter can further comprise means for generating an on-screen display of a telephone number indicative of the source of a received telephone call. Incoming telephone numbers can be stored for later display on the television, providing a form of answering machine for the user that automatically maintains a record of calls received at the user's premises.

The television signal converter can further comprise means, operatively associated with the processor, for identifying pay-per-view selections contained in the converter control signals. The identified pay-per-view selections are then communicated to a headend so that the system operator can authorize and/or bill the subscriber for the pay-per-view program ordered. In some pay-per-view implementations, the converter is preauthorized to receive a certain number of pay-per-view programs. In this instance, the pay-per-view selection data can be stored and forwarded to the headend at any time after the program has been ordered, and even after the program has been received. In other pay-per-view embodiments, the pay-per-view selection data must be transmitted to the headend for transmission of authorization signals back to the converter prior to receiving the program.

A replaceable telephone module is provided for a television signal converter. The module comprises a telephone transceiver having a wireless communication link for communicating audio signals to and from a portable telephone handset. Means are provided for communicating data signals between the telephone transceiver and a processor contained in the converter. Means are also provided in the module for coupling the telephone transceiver to a telephone network. The coupling means can communicate telephone signals between the transceiver and a central office via a television signal communication path, such as a cable television network. The module can further comprise means for establishing a telephone communication with a television service provider to communicate pay-per-view transaction data in response to data signals received from the processor.

The present invention also provides a portable telephone handset in combination with a universal remote control. A telephone microphone and earphone are mounted to a housing for generating and reproducing telephone audio signals, respectively. A plurality of keys is provided, with switch means for operatively placing said keys into a telephone mode or an appliance control mode. Means responsive to at least one of said keys in said telephone mode generates a telephone control signal. Means are provided for communicating the telephone control signal and the telephone audio signals between the handset and a telephone base station. Means responsive to at least one of the keys in the appliance control mode generate a first appliance control signal for a first appliance. Similarly, means responsive to at least one of the keys in the appliance control mode generate a second appliance control signal for a second appliance. Means are provided for communicating the first and second appliance control signals to the first and second appliances, respectively.

In an illustrated embodiment, the first appliance comprises a television signal converter, and the first appliance control signal comprises a pay-per-view television program order signal. In one implementation, the telephone control and audio signals are communicated to the base station over a first wireless communication link, e.g., an RF link. The appliance control signals are communicated to the appliances over a separate second wireless communication link, e.g., an infrared link. In another implementation, the telephone audio signals are communicated to the base station over the first wireless communication link, and the telephone control and appliance control signals are communicated over the second wireless communication link.

DETAILED DESCRIPTION OF THE INVENTION

The present invention combines the utility of a cordless telephone and remote control into a single device. In a preferred embodiment, common components of the telephone and remote control are shared, such as a keypad, keypad scanning electronics, physical package, and power supply.

Figure 1:
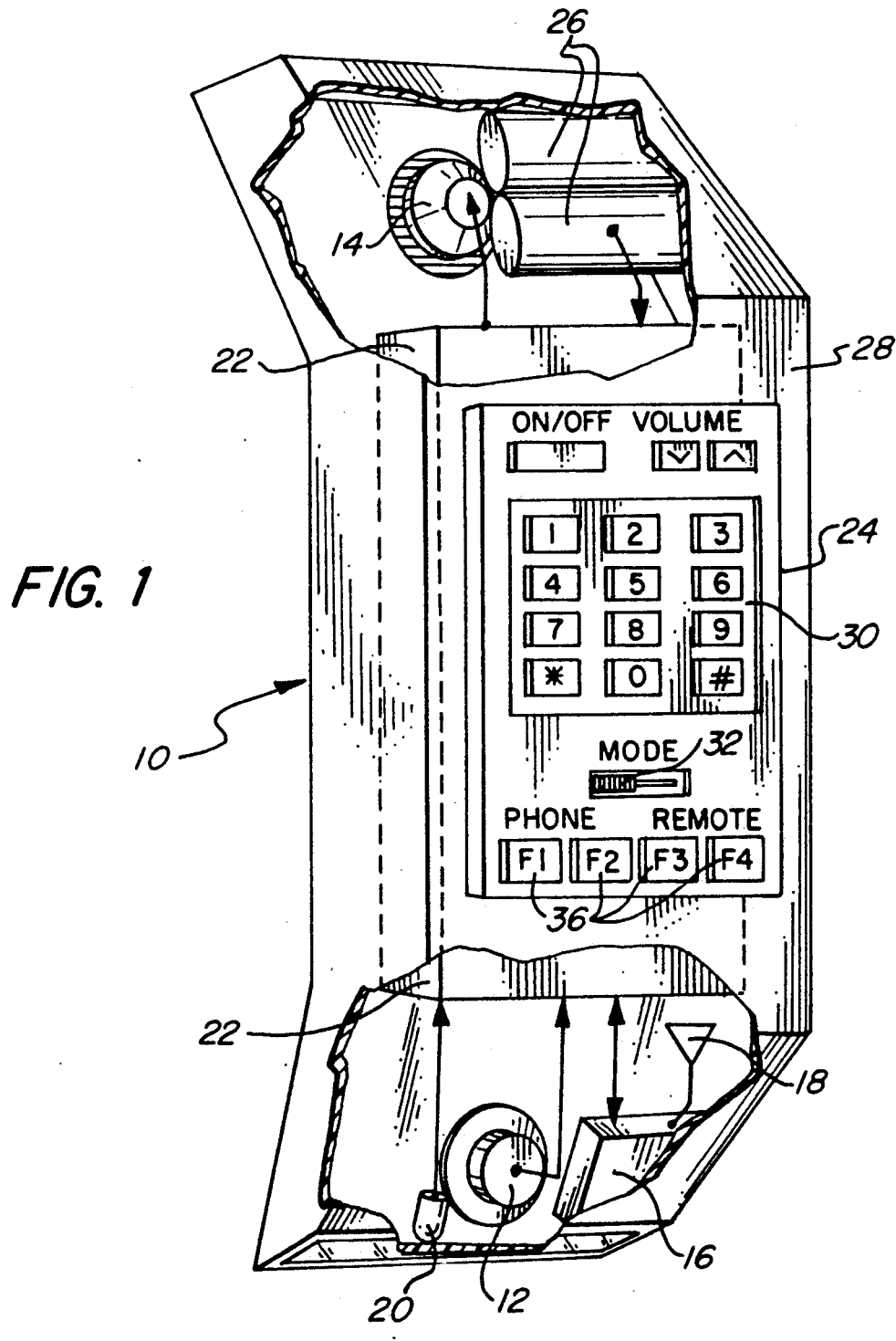
FIG. 1 is a perspective diagrammatic view of a portable telephone handset combined with a remote control in accordance with the present invention.

FIG. 1 illustrates a combined portable telephone handset and appliance remote control, generally designated 10, in accordance with the present invention. A housing 28 contains a telephone microphone 12 for converting speech to electrical signals in a conventional manner. Similarly, a conventional earphone 14 is provided for reproducing audio signals. Telephone audio is transmitted and received using an RF transceiver 16 that is coupled to an antenna 18. Control signals for both telephone functions and remote control functions are transmitted using an infrared communication link that includes a conventional infrared emitting diode 20. In an alternate embodiment, all telephone related signals, including audio and control signals, are carried over the RF transmission link while all remote control signals are carried over the infrared link.

A common keypad 24 is shared by the remote control and telephone. Number keys, qenerally designated 30, enable telephone numbers to be dialed and remote control functions, such as television channels, to be selected. A conventional on/off switch and volume control are provided for the remote control. In accordance with the present invention, a mode switch 32 is provided so that a user can select the telephone mode or the remote control mode of operation for the device. A plurality of function keys 36 enable different remote control features to be implemented. Some of these keys can be dedicated solely to television control functions. In this manner, such functions can be selected even when the remaining keys are in the telephone mode of operation. Function keys 36 are also useful where a universal remote control is provided for the operation of a plurality of different appliances, e.g., a television, VCR, satellite receiver, audio receiver, etc.

The telephone and remote control also share control electronics 22, which generally comprise a microprocessor system as described in more detail below. A common battery 26 powers the unit.

Figure 2:
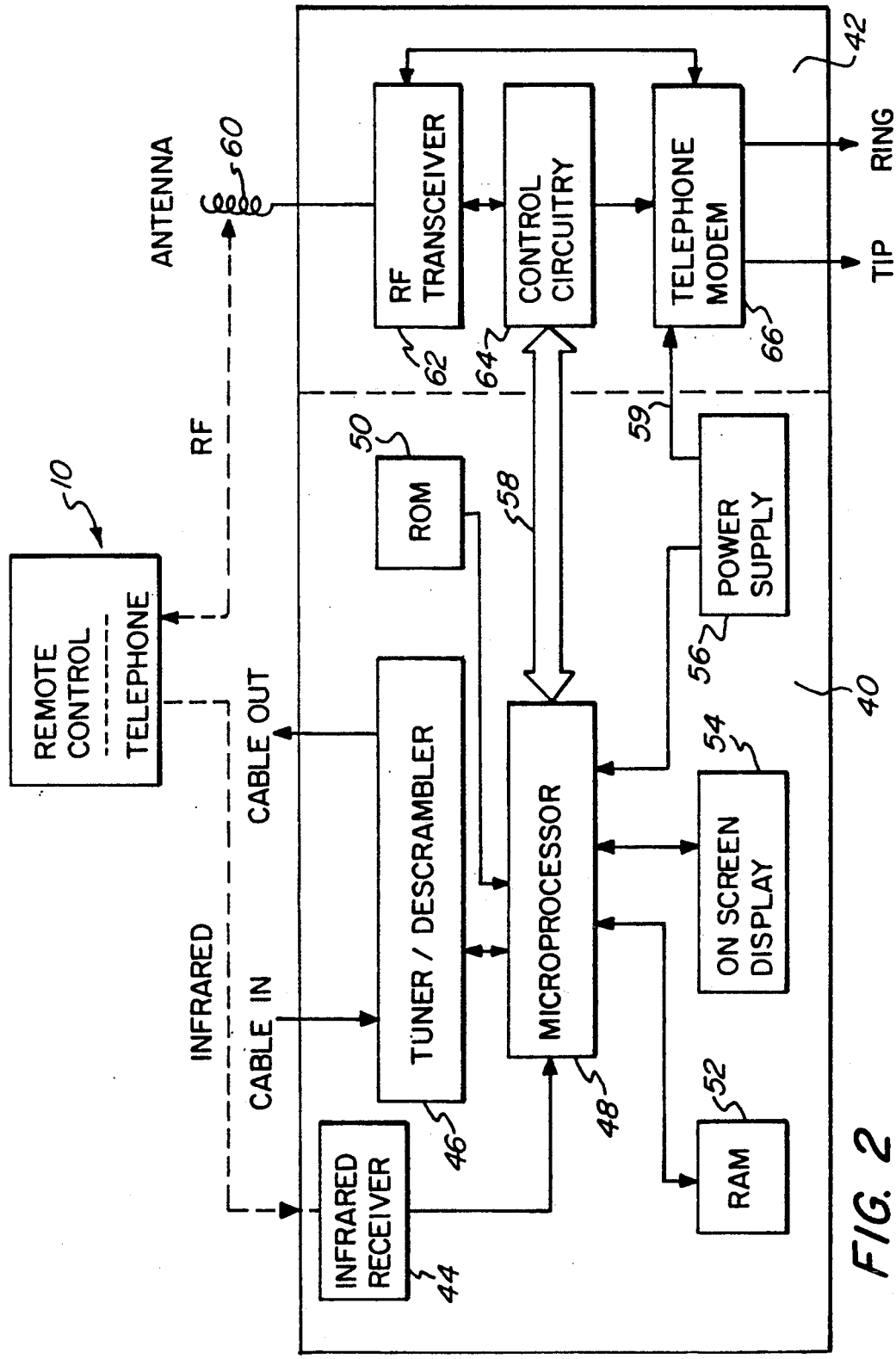
FIG. 2 is a block diagram of a remote control/telephone handset that communicates with an associated cable television converter/descrambler and telephone base station in accordance with the present invention.

A combination of the remote control/telephone handset 10 with a cable television converter/descrambler is illustrated in block diagram form in FIG. 2. As indicated, in a preferred embodiment the remote control and telephone handset includes an RF link for telephone audio communications and an infrared link for telephone and remote control data signals. A cable television converter 40 includes an interface across data bus 58 allowing a removable or integral telephone base station 42 to be installed. Installation of base station 42 also establishes a power supply connection for the base station as indicated at line 59.

With the exception of interface path 58 and power supply line 59, together with additional firmware contained in read-only memory ("ROM") 50, converter/descrambler 40 is a standard converter such as one of the Impulse 7000 Series converters sold by the Jerrold Division of General Instrument Corporation, Hatboro, Pa. An infrared receiver 44 receives IR data signals transmitted by remote control and telephone unit 10. Upon receipt, the signals are input to a microprocessor 48 for appropriate action. For example, a received signal might instruct microprocessor 48 to tune tuner/descrambler 46 to a particular cable television channel. If a premium channel is selected, and the subscriber is authorized to receive it, the signal will be descrambled in a conventional manner.

Operating firmware for microprocessor 48 is contained in ROM 50, that also contains additional firmware necessary for responding to telephone control signals received from remote control/telephone handset 10 via the infrared or RF link. Random access memory ("RAM") 52 is provided for use by microprocessor 48 in a conventional manner. Power for the microprocessor (and the telephone base station 42) is provided by a power supply 56. Conventional on-screen display circuitry 54 is coupled to microprocessor 48 to enable indicia, such as a television channel number, to be displayed on a subscriber's television. In accordance with the present invention, on-screen display circuitry 54 is also used to generate telephone number displays (both incoming phone number and outgoing phone number) for display on the subscriber's television screen. Incoming phone numbers can be stored in RAM 52 for future retrieval and display, providing users with the ability to return telephone calls they were not able to answer, for example, because they were not home.

Telephone base station 42 comprises an RF transceiver 62 that receives and transmits telephone audio signals (e.g., voice) via an antenna 60. As indicated above, a corresponding RF transceiver 16 and antenna 18 is contained in the telephone handset 10. In one embodiment, telephone control signals, such as the signals necessary to answer an incoming telephone call or to dial an outgoing call are communicated from the telephone handset 10 to cable television converter 40 via the infrared data link. The signals are received at infrared receiver 44, processed by microprocessor 48 in accordance with firmware contained in ROM 50, and communicated to control circuitry 64 in the telephone base station via data path 58. The telephone control signals could alternately be sent as RF signals, and received by RF transceiver 62 for direct communication to control circuitry 64. Control circuitry 64, which can comprise a separate microprocessor, responds to control signals from microprocessor 48 for actuating telephone functions. A telephone modem 66, which includes a touch-tone generator, is used to dial outgoing calls, receive incoming calls, and provide an interface with a telephone network. Audio signals received by telephone modem 66 are coupled to RF transceiver 62 for RF transmission to the telephone handset 10. Audio signals received from telephone handset 10 are coupled from RF transceiver 62 to telephone modem 66 for communication of the audio signals via the telephone network.

In the cable television embodiment illustrated in FIG. 2, the remote control/telephone unit 10 is easily used for ordering pay-per-view services from the cable system. These services typically include special event programs such as concerts, sporting events, movies and other entertainment that can be ordered as desired. A pay-per-view event is ordered by keying in a program number via keypad 24. The resultant data is received by microprocessor 48 via infrared receiver 44. In one embodiment, converter/descrambler 40 is preauthorized with a certain number of credits for receiving pay-per-view programs. If a subscriber's credit limit has not been depleted, the pay-per-view program will be immediately available for viewing. Microprocessor 48 will subsequently pass data to the cable system operator for billing purposes using data path 58 and telephone base station 42 to initiate a call to the headend for reporting of the information. In another embodiment, a telephone communication with the headend is established by microprocessor 48 via telephone base station 42 to request pay-per-view authorization upon receipt of a pay-per-view ordering signal from the remote control/telephone unit 10.

Figure 3:
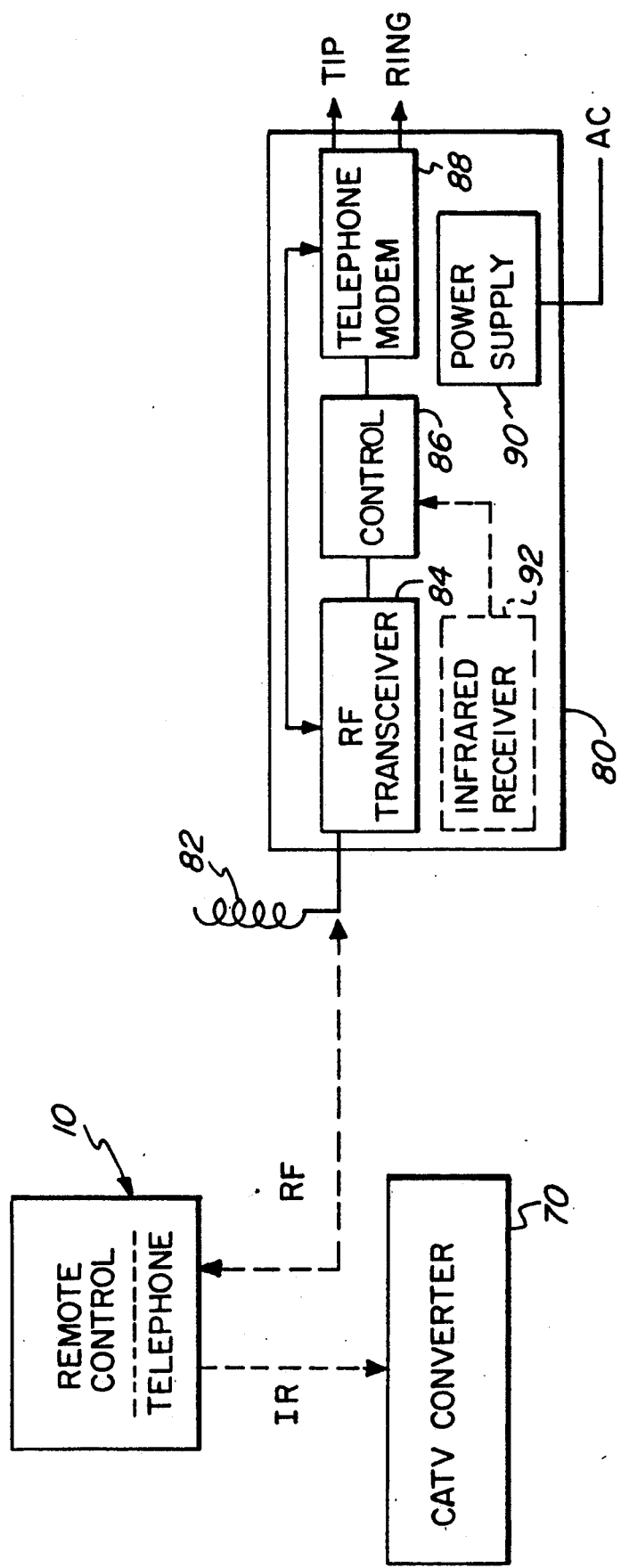
FIG. 3 is a block diagram of another embodiment in which a remote control/telephone handset is associated with a cable television converter and telephone base station.

FIG. 3 illustrates an embodiment wherein remote control/telephone unit 10 provides a universal remote control that can operate a plurality of appliances. Each different appliance, such as CATV converter 70, is controlled via an IR communication link. Telephone communications, including both voice and data, are transmitted over a two-way RF link to a telephone base station 80. The RF telephone signals are received at an antenna 82 for input to an RF transceiver 84. Control circuitry 86 responds to received data signals for answering a telephone call or placing an outgoing call. A telephone modem 88 is provided to interface with a telephone network. A power supply 90 provides power to the telephone base station 80 in a conventional manner.

In an alternate embodiment, an infrared receiver illustrated by dashed line 92 is coupled to control circuitry 86 for receiving telephone data signals from remote control/telephone handset 10. In this embodiment, the RF communication link is used only for telephone audio signals, with all control signals being transmitted over the IR path. Cost savings are realized by using the same circuitry in the remote control/telephone handset 10 for generating and transmitting both remote control signals and telephone control signals via the IR path.

Figure 4:
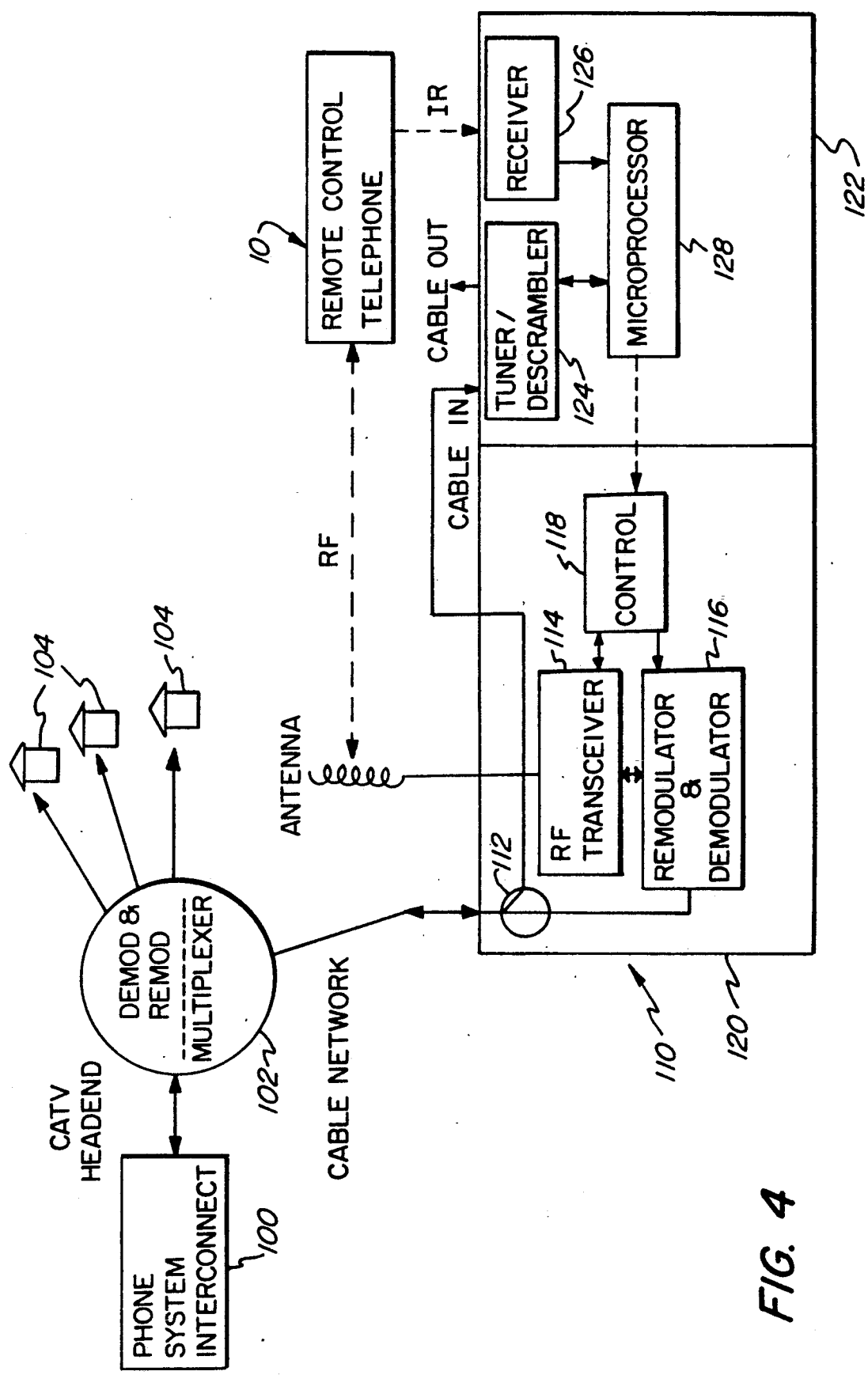
FIG. 4 is a block diagram illustrating a remote control/telephone handset associated with a cable television converter and telephone base station that communicates telephone signals over a cable network to a cable television headend.

FIG. 4 illustrates an embodiment of the present invention wherein telephone signals are communicated via a cable television network for interface with the public telephone network at a central (e.g., headend) location. The cable television headend includes a telephone signal demodulator and remodulator and multiplexer 102 for distributing telephone signals to subscribers' homes 104. Prior to connecting telephone signals from a subscriber's home to the public telephone system through interconnect 100, the signals carried on the cable television network must be demodulated by RF demodulator 102. Similarly, incoming telephone signals from interconnect 100 must be remodulated for transmission over the cable television network.

A telephone base station and cable television converter generally designated 110 is provided at each subscriber home 104. Telephone base station 120 receives signals from the cable television network and splits them into two paths at a splitter 112. One path is input to the RF cable input terminal of a CATV converter 122. Television signals are tuned and descrambled as appropriate at tuner/descrambler 124, and a cable output signal is provided for input to a subscriber's television (not shown). Tuning and descrambling authorization signals are provided by microprocessor 128 in a conventional manner. Tuning of channels is accomplished using remote control/telephone handset 10, which communicates data to an infrared receiver 126 in accordance with well known techniques. Microprocessor 128 is also coupled to control circuitry 118 in telephone base station 120 for providing telephone control signals received via the IR communication link to the telephone base station.

The second path from telephone bas station splitter 112 is input to a remodulator and demodulator 116, for recovery (demodulation) of telephone audio signals received from the cable television network and remodulation of outgoing telephone audio signals to be carried on the cable television network. The telephone portion of remote control/telephone handset 10 communicates audio signals with the telephone base station via an RF communication link. Audio signals output from the handset are received by RF transceiver 114 for subsequent remodulation and transmission on the cable television network. Incoming telephone audio signals from the cable television network are demodulated and transmitted by RF transceiver 114 to remote control/telephone handset 10. Although in one embodiment, all audio signals between telephone base station 120 and remote control/telephone handset 10 are communicated over the RF path and all data signals are communicated over the IR link, it should be appreciated that the RF link could carry all telephone related signals, including both voice and data, while the IR link carries only remote control data signals for the CATV converter.

It should now be appreciated that the present invention provides an economical remote control/telephone handset that shares many components and is particularly advantageous for use in combination with a cable television converter/descrambler. In a preferred embodiment, two separate communication paths are provided. An RF link is used at least for telephone audio signals. An IR link is used at least for all television control signals. By providing an RF audio link, there is no need to keep the telephone handset pointed at the receiver during a telephone conversation, as is necessary when using an IR link.

Although the invention has been described in connection with various preferred embodiments, those skilled in the art will appreciate that numerous modifications and adaptations may be made without departing from the spirit and scope of the invention as set forth in the following claims.

What is claimed is:

1. A television remote control and telephone handset apparatus comprising:
   a housing;
   a plurality of keys on said housing;
   means responsive to the actuation of at least one of said keys for generating a television control signal;
   means for transmitting said television control signal via an infrared communication link;
   a microphone;
   means coupled to said microphone for transmitting telephone audio from said microphone via a radio frequency communication link;
   an earphone for reproducing telephone audio; and
   means coupled to said earphone for receiving telephone audio via said radio frequency communication link.

2. Apparatus in accordance with claim 1 further comprising:
   means responsive to the actuation of at least one of said keys for generating a telephone control signal; and
   means for transmitting said telephone control signal via said radio frequency communication link.

3. Apparatus in accordance with claim 1 further comprising:
   means responsive to the actuation of at least one of said keys for generating a telephone control signal; and
   means for transmitting said telephone control signal via said infrared communication link.

4. Apparatus in accordance with claim 3 wherein said television and telephone control signal generating means share a microprocessor coupled to receive actuation signals from said keys and output the control signals to said infrared communication link.

5. A portable telephone handset comprising:
   a housing;
   a telephone microphone and earphone mounted on said housing for generating and reproducing telephone audio signals, respectively;
   a plurality of keys on said housing;
   switch means for operatively placing said keys into a telephone mode or an appliance control mode;
   means responsive to at least one of said keys in said telephone mode for generating a telephone control signal;
   means for communicating said telephone control signal and telephone audio signals between said handset and a telephone base station;
   means responsive to at least one of said keys in said appliance control mode for generating a first appliance control signal for a first appliance;
   means responsive to at least one of said keys in said appliance control mode for generating a second appliance control signal for a second appliance; and
   means for communicating said first and second appliance control signals to said first and second appliances, respectively.

6. A handset in accordance with claim 5 wherein said first appliance is a television signal converter, and the first appliance control signal comprises a pay-per-view television program order signal.

7. A handset in accordance with claim 5 wherein said telephone control and audio signals are communicated to said base station over a first wireless communication link and said appliance control signals are communicated to said appliances over a separate, second wireless communication link.

8. A handset in accordance with claim 5 wherein said telephone audio signals are communicated to said base station over a first wireless communication link and said telephone control and appliance control signals are communicated to said base station and said appliances over a separate, second wireless communication link.

9. A replaceable module for a television signal converter comprising:
   a telephone transceiver having a wireless communication link for communicating audio signals to and from a portable telephone handset;
   means for communicating data signals between said telephoner transceiver and a processor contained in said converter; and
   means for coupling said telephone transceiver to a telephone network.

10. A module in accordance with claim 9 further comprising:
    means for establishing a telephone communication with a television service provider to communicate pay-per-view transaction data in response to data signals received from said processor.

11. A module in accordance with claim 9 wherein said coupling means communicates telephone signals between said transceiver and a central office via a television signal communication path.

12. A module in accordance with claim 11 wherein said television signal communication path is a cable television network.

13. Remote controlled television signal converter apparatus comprising:
    means for receiving a television signal;
    means coupled to said receiving means for converting said television signal to a format suitable for reproduction on a television set;
    means coupled to said converter means for outputting the converted signal to a television set;
    control means for processing a converter remote control signal received over a first communication path and a telephone remote control signal received over a second communication path;
    means responsive to the telephone remote control signal received by said control means for establishing a communication over a telephone network; and
    transmitter means for communicating a telephone audio signal received from said network to a remote control over said second communication path;
    said remote control comprising:
    a keypad;
    first transmitter means, responsive to said keypad, for transmitting television control signals to said converter control means over said first communication path;
    a microphone for providing a telephone audio signal for transmission;
    second transmitter means, responsive to said keypad and microphone, for transmitting telephone control and audio signals to said converter control means over said second communication path;
    receiver means for receiving telephone audio signals from said television signal converter; and
    an earphone for reproducing the received telephone audio signals.

14. Apparatus in accordance with claim 13 wherein said first signal path is an infrared path and said second signal path is an RF signal path.

15. Apparatus in accordance with claim 13 wherein said remote control enables simultaneous communication of converter and telephone signals over said first and second paths, respectively.

16. Apparatus in accordance with claim 15 wherein said first signal path is an infrared path and said second signal path is an RF signal path.

17. Apparatus in accordance with claim 13 wherein:
    said keypad comprises a plurality of dedicated switches for actuating only converter control functions and a plurality of shared switches for actuating converter control and telephone control functions; and
    said dedicated switches are available to control said converter via a communication over said first path concurrently with the transmission of telephone signals over said second path.

18. Apparatus in accordance with claim 17 wherein said first signal path is an infrared path and said second signal path is an RF signal path.

19. A television signal converter for communicating with a remote control and telephone handset, comprising:
    an infrared data signal receiver;
    processor means coupled to said infrared receiver for processing received converter control signals;
    means operatively associated with said processor means for controlling a converter function in response to a received converter control signal; and
    telephone base station means coupled to said processor means for communication of telephone audio signals to and from said handset via an RF communication link.

20. A converter in accordance with claim 19 wherein said processor means includes:
    means for identifying a pay-per-view selection contained in said converter control signals; and
    means for communicating said pay-per-view selection to a headend.

21. A converter in accordance with claim 19 further comprising:
    means operatively associated with said processor means for generating an on-screen display of a telephone number identified by said telephone control signals; and
    means for outputting said on-screen display for reproduction on a television.

22. A converter in accordance with claim 21 further comprising:
    means operatively associated with said processor means for generating an on-screen display of a telephone number indicative of the source of a telephone call received by said telephone base station means.

23. A converter in accordance with claim 22 further comprising:
    means for storing telephone number data indicative of the source of a telephone call received by said telephone base station means for future retrieval and display on said television.

24. A converter in accordance with claim 19 further comprising:
    interface means coupled to said telephone base station for communicating telephone signals to a central office via a television signal communication path.

25. A converter in accordance with claim 24 wherein said television signal communication path is a cable television network.

26. A converter in accordance with claim 24 wherein said means for communicating a pay-per-view selection comprises:
means for actuating said telephone base station means to establish a telephone communication with said headend for reporting said pay-per-view selection.

27. A converter in accordance with claim 19 wherein said processor means also processes received telephone control signals, said converter further comprising:
means operatively associated with said processor means for controlling a telephone function in response to a received telephone control signal.

28. A unitary television remote control and telephone handset in combination with the converter of claim 27 comprising:
means responsive to a user input for generating a converter control signal;
means responsive to a user input for generating a telephone control signal;
infrared transmitter means for transmitting said converter control signal to said infrared data signal receiver;
a microphone;
RF transmitter means coupled to said microphone for transmitting telephone audio from said microphone to said telephone base station means;
an earphone for reproducing telephone audio; and
RF receiver means coupled to said earphone for receiving telephone audio from said telephone base station means.

29. Apparatus in accordance with claim 28 wherein said converter control signal generating means and telephone control signal generating means share a microprocessor coupled to receive user inputs from a user interface and output the control signals for transmission.

30. Apparatus in accordance with claim 28 wherein said telephone control signal is transmitted to said converter by said infrared transmitter means.

31. Apparatus in accordance with claim 28 wherein said telephone control signal is transmitted to said telephone base station by said RF transmitter means.

* * * * *